United States Patent
Nistri et al.

[15] 3,687,915
[45] Aug. 29, 1972

[54] PROCESS FOR THE PRODUCTION OF SYNTHETIC RUBBERS

[72] Inventors: Ugo Nistri, Via Breno 9; Benito Busti, Via Enrico Fermi 16/A; Giulio Grazzini, Via Gozzano 18, all of Milan, Italy

[22] Filed: Oct. 9, 1969

[21] Appl. No.: 865,189

[30] Foreign Application Priority Data

Oct. 12, 1968 Italy.....................22415 A/68

[52] U.S. Cl.............260/83.3, 260/85.1, 260/94.7 R, 260/96 R, 260/821
[51] Int. Cl. ...........C08d 5/00, C08f 1/88, C08f 1/92
[58] Field of Search............260/85.1, 83.3, 94.7, 821

[56] References Cited

UNITED STATES PATENTS

| | | | |
|---|---|---|---|
| 2,261,790 | 11/1941 | Bender | 260/821 |
| 2,284,520 | 5/1942 | Hassett | 260/821 UX |
| 2,526,431 | 10/1950 | Strickhouser | 260/821 X |
| 2,615,010 | 10/1952 | Troyan | 260/85.1 |
| 3,207,828 | 9/1965 | Petersen et al. | 264/175 |

*Primary Examiner*—Joseph L. Schofer
*Assistant Examiner*—William F. Hamrock
*Attorney*—Sughrue, Rothwell, Mion, Zinn & Macpeak

[57] ABSTRACT

Butadiene-styrene or acrylonitrile rubbers are separated from emulsion-polymerization latices on a heated surface.

6 Claims, No Drawings

PROCESS FOR THE PRODUCTION OF SYNTHETIC RUBBERS

The invention relates to the production of synthetic rubbers.

Processes for the production of butadiene-styrene and butadiene-acrylonitrile rubbers have long been known. They consist essentially of the polymerization of monomers in aqueous emulsion in the presence of catalysts of the peroxide or redox type together with polymerization regulators for controlling the molecular weight.

The polymerization, which is carried out at temperatures of about 5° C. (cold rubbers) or about 50° C. (hot rubbers), is normally stopped when monomer conversion is only partial, so as to avoid the occurrence of secondary polymerization effects which impart undesirable properties.

The latex containing the polymer and unreacted monomers is then freed from the butadiene by instantaneous evaporation at atmospheric pressure. The styrene or acrylonitrile is subsequently removed by stripping under high vacuum, normally in columns with perforated plates, in the presence of steam. Anti-oxidant is then added to the latex and the solid polymer is precipitated in flocculated form by coagulation with a salt and an acid. Finally, the floc is filtered out and dried.

These processes have various drawbacks. Conditions are particularly critical in the recovery of the unreacted high-boiling monomers. Moreover, numerous operations are needed for recovery of the solid polymer, which are difficult to carry out, and expensive. Finally, owing to difficulties in coagulation and drying, the polymers obtained often have characteristics that are not entirely satisfactory.

It has now been discovered that synthetic rubbers of butadiene-styrene and butadiene-acrylonitrile type can be separated from emulsion-polymerization latices, while avoiding or reducing the difficulties arising from processes known hitherto, by using a process in which water and unreacted styrene or acrylonitrile monomer are evaporated from a film of the latex on a heated surface to give the rubber in coagulated, dried sheet form.

This procedure results especially in considerable simplification of the work, the financial advantages of which will be obvious. It has been found, moreover, that butadiene-styrene and butadiene-acrylonitrile rubbers obtained by the process of the invention described herein in detail have better characteristics than those of products obtained by traditional methods, particularly as regards the modulus of elasticity, dielectric constant and workability.

The butadiene and styrene or butadiene and acrylonitrile may be co-polymerized continuously or discontinuously, for example in aqueous emulsions of resinous soaps or of fatty acids, and the catalysts used may be of the persulphate or redox type, such as, for example, peroxides in combination with a reducing compound, usually a ferrous salt.

In a suitable process for the polymerization, which is preferably carried out at the temperature levels already mentioned in the production of "cold rubbers" and "hot rubbers," the molecular weight of the polymers is controlled by means of polymerization regulators, suitably mercaptans. The monomer conversion is only partial, so as to avoid the formation of products having undesirable properties. Hydroquinone or a polysulphide is preferably used for halting the polymerization reaction. The butadiene monomer is removed from the reaction products by instantaneous distillation at ambient pressure, after which an anti-oxidant, generally an amino compound is added, a further addition being made, in the production of oil-extended rubbers, of a naphthenic, paraffinic or aromatic oil, normally in quantities of from 20 to 50 parts in every 100 parts of rubber.

Next the latex is fed onto, for example, rotating drums, heated internally so as to drive out the water and the high-boiling monomers that have not reacted (styrene or acrylonitrile) and recover the solid polymer in sheet form.

It has been found that the best results are obtained when the temperature of the rubber on the heated surfaces is 70° C. to 120° C. and preferably 90° C. to 110° C., the environment being maintained at less than ambient pressure, so as to promote elimination of the water and monomers as vapor.

In one typical form of the application of the process of the invention, use is made of a pair of contra-rotating driers, heated internally with steam at a pressure of 6 kg./sq.cm. The latex, after removal of the residual butadiene has been removed, is fed on to these driers. The conditions are regulated so that the temperature of the polymer, which is being gradually deposited in the form of a film, is approximately 100° C.

When the environment is maintained at a pressure of the order of 700 to 760 mm. of mercury, the water and the high-boiling monomer residues are eliminated and high-quality butadiene-styrene and butadiene-acrylonitrile rubbers are obtained, having a residual moisture content of less than 0.5 percent by weight and a free monomer content of less than 100 p.p.m.

The following example illustrates the invention. It is preceded by a comparative run of the known process.

COMPARATIVE RUN

The latex specimen used was that commonly known as SBR 1500 and had the following properties:

| | |
|---|---|
| conversion | 62% |
| viscosity ML (1+4) 100°C. | 52 |
| fixed styrene | 23.5 |

After being freed of unreacted monomer the latex received an addition of the anti-oxidant known commercially as "BLE" in an amount equal to 1.25 percent dry weight and was then coagulated by the addition of sulphuric acid and sodium chloride, both in quantities of 0.5 percent, likewise related to dry weight.

The floc resulting was filtered out and dried and the rubber obtained was vulcanized at 145° C. for 50 minutes, using the following mix:

| | |
|---|---|
| Raw polymer: | 400 parts by weight |
| N.B.S. Std. black B P C | 160 parts by weight |
| N.B.S. Std. zinc oxide | 20 parts by weight |
| N.B.S. Std. sulphur | 8 parts by weight |
| N.B.S. Std. stearic acid | 6 parts by weight |
| N.B.S. Std. NBTS | 12 parts by weight |

Analysis of the vulcanized rubber gave the following results:

| | |
|---|---|
| viscosity ML (1+4) 100°C. | 72 |
| breaking strain 50' kg./sq.cm. | 265 |
| elongation at break 50'% | 650 |
| modulus 300% 100' kg./sq.cm. | 84 – 134 |

EXAMPLE 1

To a specimen of latex of the type described in the comparative run was added 1.25 percent or dry weight of the anti-oxidant known commercially as "BLE," the latex then being fed on to a pair of contra-rotating driers.

The latex when fed was at ambient temperature, while the driers where heated internally with steam at a pressure of 6 kg./sq.cm.

The pressure round the driers was maintained at a level of about 720 mm. of mercury.

The rate of feed of the latex was regulated in such a way that the rubber, which was discharged in the form of a film, was at a temperature of approximately 100° C.

The raw rubber so obtained was vulcanized as in the comparative run.

Analysis of the vulcanized rubber gave the following results:

| | |
|---|---|
| viscosity ML (1+4) 100°C. | 68 |
| breaking strain 50' kg./sq.cm. | 300 |
| elongation at break 50'% | 750 |
| modulus 300% 100' kg.sq.cm. | 90 – 150. |

It should be noted that antioxidant BLE is an acetone/phenylamine condensate; 'N.B.S. Std.' is abbreviated for the National Bureau of Standards; black BPC is a carbon black; and NBTS is mercapto-benzodiazo-disulphide. In the vulcanizate the properties are those at the indicated number of minutes of vulcanization, the viscosity being the Mooney viscosity.

We claim:

1. A process for the separation of butadiene-styrene or butadiene-acrylonitrile rubbers from aqueous emulsion-polymerization lattices which comprise a latex of the rubber, unreacted monomeric butadiene, styrene or acrylo-nitrile and water, comprising:

1. separating unreacted monomeric butadiene from said lattices to thereby provide an aqueous composition consisting essentially of the latex of the rubber, monomeric styrene or acrylonitrile and water;
    2. feeding the aqueous composition onto an internally heated surface and maintaining the same on said internally heated surface in the form of a film;
    3. maintaining the temperature of the film at a temperature of 70° to 120° C while maintaining the film under a pressure of 700 to 760 mm Hg, and simultaneously:
        i. evaporating monomeric styrene or acrylonitrile and water from the film by the action of said heated surface and said pressure;
        ii. coagulating the latex to provide the butadiene-styrene or the butadiene-acrylonitrile rubber in the substantial absence of coagulating agents by the heat from the heated surface;
    4. discharging the rubber from the heated surface in sheet form at a temperature of 70° to 120° C and having a residual moisture content of less than 0.5 percent by weight and a free monomer content of less than 100 ppm.

2. A process according to claim 1, in which the temperature is between 90° and 110° C.

3. A process according to claim 1, in which the internally heated surface is a rotating drum.

4. A process according to claim 1 in which the rubber is butadiene-styrene and the monomeric materials initially present are butadiene and styrene.

5. A process according to claim 1 in which the rubber is butadiene-acrylonitrile and the monomeric materials initially present are butadiene and acrylonitrile.

6. A process according to claim 1 which consists of the recited steps.

* * * * *